US012368729B1

(12) United States Patent
Lin et al.

(10) Patent No.: US 12,368,729 B1
(45) Date of Patent: Jul. 22, 2025

(54) GRAPH-BASED MULTI-STAGED ATTACK DETECTION AND VISUALIZATION IN THE CONTEXT OF AN ATTACK FRAMEWORK

(71) Applicant: Exabeam, Inc., Foster City, CA (US)

(72) Inventors: Derek Lin, San Mateo, CA (US); Yoon Jung Hong, Fremont, CA (US)

(73) Assignee: Exabeam, Inc., Foster City, CA (US)

( * ) Notice: Subject to any disclaimer, the term of this patent is extended or adjusted under 35 U.S.C. 154(b) by 269 days.

(21) Appl. No.: 18/110,691

(22) Filed: Feb. 16, 2023

(51) Int. Cl.
*H04L 9/40* (2022.01)

(52) U.S. Cl.
CPC ...... *H04L 63/1416* (2013.01); *H04L 63/1441* (2013.01)

(58) Field of Classification Search
CPC .................. H04L 63/1416; H04L 63/1441
USPC ............................................................ 726/23
See application file for complete search history.

(56) References Cited

U.S. PATENT DOCUMENTS

| | | | |
|---|---|---|---|
| 11,736,527 B1* | 8/2023 | Joseph Durairaj | H04L 63/1433 726/1 |
| 12,063,226 B1* | 8/2024 | Lin | H04L 63/1416 |
| 2020/0137104 A1* | 4/2020 | Hassanzadeh | H04L 63/1433 |
| 2020/0177618 A1* | 6/2020 | Hassanzadeh | G06F 21/552 |
| 2021/0126938 A1* | 4/2021 | Trost | G06F 21/552 |
| 2021/0133331 A1* | 5/2021 | Lipkis | H04L 63/1483 |
| 2022/0030017 A1* | 1/2022 | Infante-Lopez | G06F 16/9024 |

* cited by examiner

*Primary Examiner* — Kambiz Zand
*Assistant Examiner* — Aubrey H Wyszynski
(74) *Attorney, Agent, or Firm* — Lessani Law Group, PC (57) ABSTRACT

The present disclosure relates to a system, method, and computer program for graph-based multi-stage attack detection in which alerts are graphically visualized in the context of tactics in an attack framework. The method enables the detection of cybersecurity threats that span multiple users and sessions and provides for the display of threat information in the context of a framework of attack tactics. Alerts spanning an analysis window are grouped into tactic blocks. Each tactic block is associated with an attack tactic and a time window. A graph is created of the tactic blocks, and threat scenarios are identified from independent clusters of directionally connected tactic blocks in the graph. The threat information is visualized graphically in the context of a sequence of attack tactics in the attack framework. A user can toggle between graphical visualizations of a cluster as a whole and the individual threat scenario paths in the cluster.

19 Claims, 12 Drawing Sheets

DISPLAYING THREAT-SCENARIO INFORMATION

FIG. 3

RANKED LIST OF THREAT SCENARIOS

| Alerts | Watchlist | Scenarios |

🔍 [_______________] Search

_410_

[NEW] 600 — _415_
EVENTS 398 | RISK REASONS 60 _420 425_ | SCENARIOS 4 _430_
_450_
Initial Access (300) → Privilege Escalation (200) →
Defense Evasion (90) → Lateral Movement (10)
👤 User    john.doe
💻 Asset   gdl_vdicom_0169
_460_

STARTED 2022/03/10 09:13:28
LAST UPDATED 2022/03/11 23:16:07  } _445_
DURATION 38 hrs _405a_

[NEW] 599
EVENTS 398 | RISK REASONS 60 | SCENARIOS 4
Initial Access (300) → Execution (9)
👤 User    eko.zedong, jaycee.jaci
💻 Asset   thnpc5-djo56, thnpc5-djow11

STARTED 2022/03/10 09:13:28
LAST UPDATED 2022/03/11 23:16:07
DURATION 38 hrs

_405b_

[REVIEWED] 499
EVENTS 398 | RISK REASONS 60 | SCENARIOS 10
Privilege Escalation (400) → Defense Evasion (99)
👤 User    celyn.sal
💻 Asset   val80022603-w10

STARTED 2021/10/01 13:54:52
LAST UPDATED 2021/10/14 12:25:07
DURATION 312 hrs

_405c_

[REVIEWED] [CASE 12345] 399
EVENTS 398 | RISK REASONS 60 | SCENARIOS 4
Initial Access (100) → Privilege Escalation (200) →
Defense Evasion (90) → Lateral Movement (9)
👤 User    User 1, User 2, administrator (sfo-netsvc-wp1), rqzdbtqnmi +4
💻 Asset   192.168.9.55, val80022603-w10, xps15-111111

STARTED 2022/03/10 09:13:28
LAST UPDATED 2022/03/11 23:16:07
DURATION 38 hrs

_405d_

Last updated

GRAPH-BASED MULTI-STAGED ATTACK DETECTION AND VISUALIZATION IN THE CONTEXT OF AN ATTACK FRAMEWORK

BACKGROUND OF THE INVENTION

1. Field of the Invention

This invention relates generally to cyberattack security and detection in computer networks, and more specifically to graph-based, multi-staged cybersecurity attack detection and visualization in the context of an attack framework.

2. Description of the Background Art

Cybersecurity monitoring systems generate alerts for analysts to investigate. For a large organization, a huge volume of alerts is generated on a daily basis, and it is difficult for analysts at such organizations to investigate alerts individually. As a result, presenting alerts in a meaningful and understandable way is critical for the usability of cybersecurity monitoring systems. A common approach to detecting cybersecurity threats and organizing alerts is on a per-user and per-24-hour session approach. There are a number of issues with this approach:

- The 24-hour resolution is arbitrary. A given threat is not necessarily confined within the rigid 24-hour resolution.
- Slow-and-low attack detection is difficult to address. Since sessions are essentially scored independent from one another, malicious activity from one session is not connected with other future or past sessions of the same user or those of other users.
- Most critically, it is challenging for analysts to act on a seemingly random collection of alerts with no immediate story to tell. The burden is on the analysts to evaluate the severity scope of a session.

Therefore, there is strong demand for a solution that automatically and intelligently connects alerts in a way that detects attacks across users and sessions and that presents the connected alerts with an immediate story to tell.

SUMMARY OF THE DISCLOSURE

The present disclosure relates to a system, method, and computer program for graph-based multi-stage attack detection in which alerts are graphically visualized in the context of a sequence of tactics in an attack framework, such as the MITRE ATT&CK framework. The method enables the detection of cybersecurity threats that span multiple users and sessions and provides for the display of threat information in the context of a framework of attack tactics.

A computer system for detecting cybersecurity attacks obtains a plurality of cybersecurity alerts generated in an analysis window, such as a 30-60 day window. The system classifies each of the alerts with an attack tactic in an attack framework having a sequence of attack tactics.

The system then groups the alerts into tactic blocks, where each tactic block is associated with a start time, an end time, and an attack tactic. The system creates a graph of tactic blocks by directionally connecting blocks based on a time criterion, a tactic criterion, and a matching criterion related to one or more fields in the plurality of cybersecurity alerts. Directionally connecting tactic blocks based on the time, tactic, and matching criteria enables multi-stage threat detection.

In certain embodiments, the time criterion for directionally connecting a first tactic block to a second tactic block is satisfied if the first block has an earlier start time than the second block and if the end time of the first block is within P hours of the start time of the second block.

In certain embodiments, the tactic criterion for directionally connecting a first tactic block to a second tactic block is satisfied if the tactic is associated with the first block is the same or proceeds the tactic associated with the second block in the attack framework.

In certain embodiment, the matching criterion for directionally connecting a first tactic block to a second tactic block is satisfied if one or more of the following is true:
(a) the first and second blocks are associated with the same username;
(b) the first and second blocks share the same source host computer;
(c) any of the first block destination host computers matches the second block's source host computer; or
(d) one or more alerts from the first block share a common value for a select attribute (e.g., email subject, shared hash, filename, etc.) with one or more alerts from the second block.

After creating the graph, the system identifies one or more independent clusters of interconnected components in the graph of tactic blocks. For example, the system may identify connected components in the graph using a connected components algorithm in graph theory. For each of the clusters, the system identifies one or more threat scenario paths in the cluster, wherein each threat scenario path comprises a sequence of attack tactics in the attack framework. For each of the clusters, the system identifies a primary threat scenario path. In one embodiment, identifying a primary risk scenario threat path comprises performing a risk assessment on each of the threat scenario paths in the cluster. The path with the highest risk assessment is identified as the primary risk scenario path.

The system ranks the primary threat scenarios and displays information for the n highest ranked primary threat scenarios, wherein n is an integer greater than or equal to 1. The information displayed for a threat scenario includes a sequence of attack tactics associated with the threat scenario. In this way, the threat is presented with a "story" of the threat as told by the sequence of attack tactics.

The system enables a user to see this "story" visually. A user may select any of the n highest ranked threat scenarios and see a number of graphical visualizations related to the threat scenario. The user can toggle between graphical visualizations of the cluster as a whole and the individual threat scenario paths in the cluster, including the primary threat scenario path. The visualization includes a first type of graphical user interface (GUI) element for each tactic block in the cluster and a second type of GUI element illustrating directional connections between the tactic blocks. For example, each tactic block may be represented by a graphical block, and the directional connections between the blocks may be represented by arrows. The user interface also includes a timeline, which adjusts as the user toggles through the different visualizations, to reflect the timeline associated with the currently displayed cluster or threat scenario.

DETAILED DESCRIPTION OF THE PREFERRED EMBODIMENTS

The present disclosure relates to a system, method, and computer program for graph-based multi-stage attack detection in which alerts are graphically visualized in the context of tactics in an attack framework, such as the MITRE ATT&CK framework. The method is implemented in software and performed by a computer system that detects and assesses cyber threats in a network. The computer system may be a user behavior analytics (UBA) system or a user-and-entity behavior analytics system (UEBA). An example of a UBA/UEBA cybersecurity monitoring system is described in U.S. Pat. No. 9,798,883 issued on Oct. 24, 2017, and titled "System, Method, and Computer Program for Detecting and Assessing Security Risks in a Network," the contents of which are incorporated by reference herein.

An embodiment of the invention is described below with respect to FIG. 1.

1. Grouping Alerts into Tactic Blocks

The system receives and/or generates security alerts on an on-going basis. The alerts may be in the form of triggered fact or anomaly-based rules, or they may be in form of events with non-zero risks in the case of a non-rule-based system that assesses event risks based on probability calculations. The system may generate the alerts itself and/or receive alerts from other cyber-monitoring systems.

The input to the method is a collection of alerts over a time frame, such as a day or several months. The time frame is referred to as the analysis window herein. In one embodiment, the method is performed on a daily basis, such as a batch job at the end of each day, using alert data from the past 30-60 days (i.e., an analysis window of the past 30-60 days). In certain embodiments, the method is performed in real time, such that the result is updated as soon as an input alert is received. In certain embodiments, the system may filter out certain rules, such as rules that trigger frequently, from the analysis window.

Figure 1A:
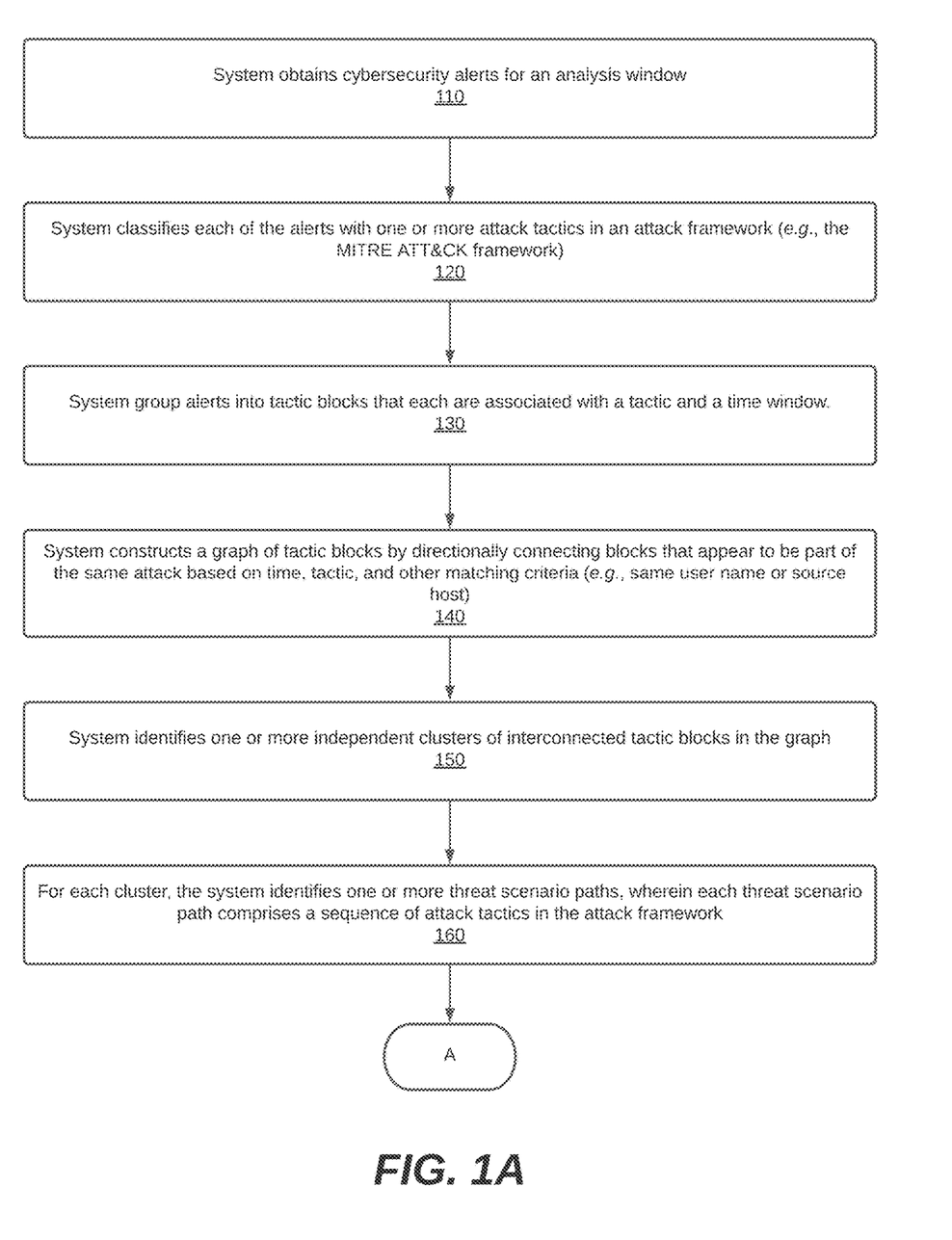
FIGS. 1A-1B are flowcharts that illustrate a method, according to one embodiment, for graph-based multi-stage attack detection in which alerts are displayed in the context of tactics in an attack framework.
Figure 1B:
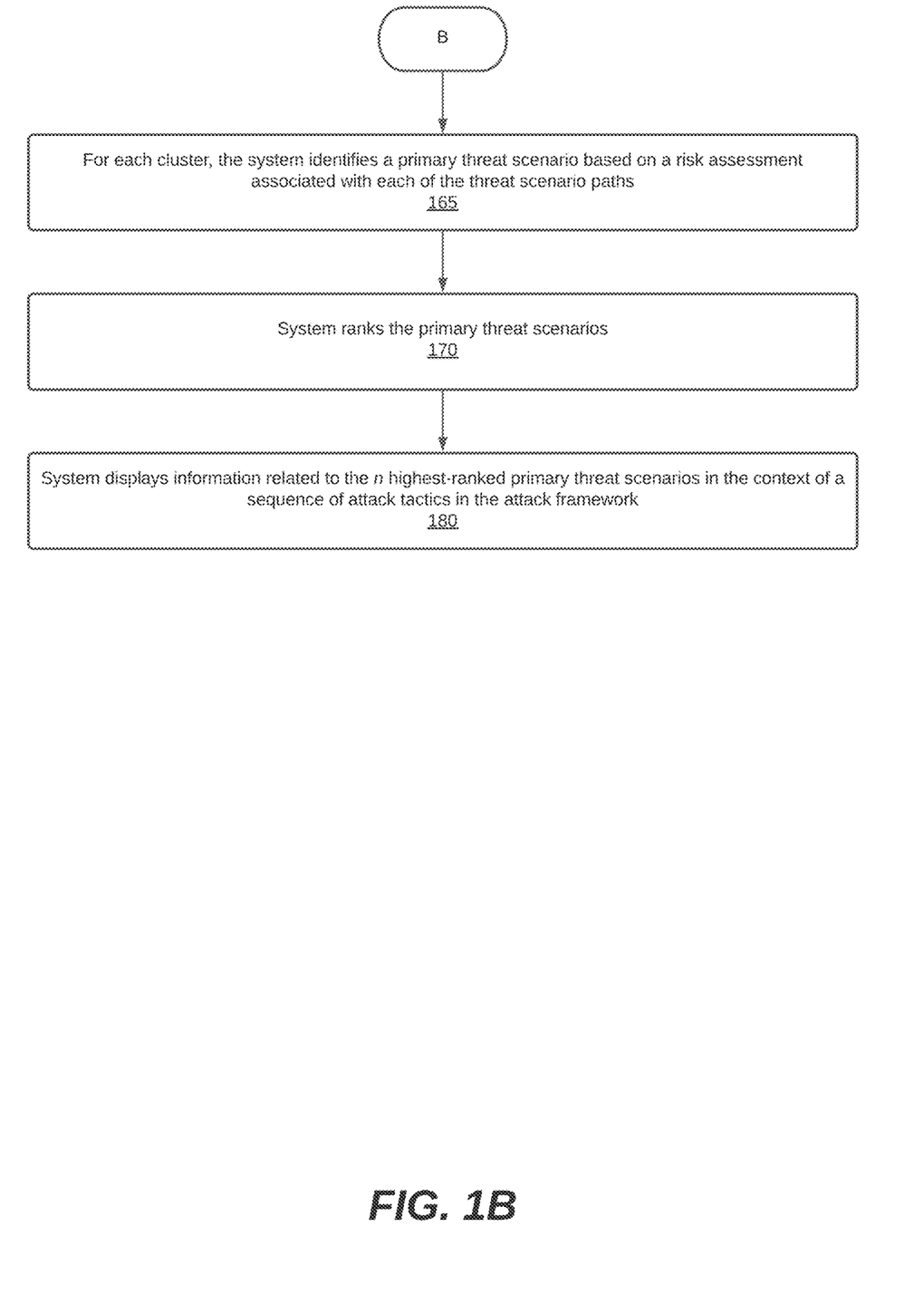

As shown in FIGS. 1A-1B, the system obtains the alerts generated or received in an analysis window (step 110). The system classifies each of the alerts with one or more attack tactics in an attack framework (step 120). An attack framework categorizes attack techniques into a number of attack tactics. An example of an attack framework is the MITRE ATT&CK framework which has the following twelve attack tactics: Initial Access, Execution, Persistence, Privilege Escalation, Defense Evasion, Credential Access, Discovery, Lateral Movement, Command and Control, Exfiltration, and Impact. A number of attack techniques are mapped to each of these attack tactics. In one embodiment, each rule or event that can be the basis of an alert is pre-tagged with one or more attack techniques in the attack framework. In step 120, the system classifies an alert with one or more attack tactics by mapping the attack technique(s) associated with the alert to the applicable tactic(s) in the framework.

The system organizes alerts in the analysis window into groups referred to herein as "tactic blocks" (step 130). A tactic block is a group of alerts that satisfy an alert grouping criteria, including having the same tactic and falling within a certain time window. In one embodiment, alerts are grouped into tactic blocks based on tactic, time, username, and source host. Each tactic block is associated with a start and end time based on the start and end timestamps of the first and last alert in the tactic block. In one embodiment, alerts are first grouped based on tactic, username, and source host. If there are gaps of more than X amount of time (e.g., X=24 hours) between alerts, then the tactic block is split into smaller blocks.

An alert may appear in more than one tactic block. An alert associated with y tactics will be part of y tactic blocks, where y is an integer greater than or equal to 1. As a result, there may be multiple tactic blocks that are identical except for the tactic associated with the tactic block.

2. Graphing Tactic Blocks

A graph-based approach is used to ascertain "attack stories" from the tactic blocks, where the tactic blocks are the nodes of the graph. The system constructs a graph of tactic blocks by sorting tactic blocks by their start times and directionally connecting blocks that appear to be part of the same attack based on time, tactic, and matching criteria related to one or more fields in the plurality of cybersecurity alerts (e.g., same username or source host) (step 140). The matching criteria may be based on attributes of the tactic blocks that are in addition to time and tactic. For example, if the alerts are grouped into tactic blocks based on time, tactic, username, and source host, then the tactic blocks may be matched using the username and source host attributes of the blocks. Blocks may also be matched if there are some common attribute values between alerts from blocks, such as filename, email subject, file hash, or any other desired indicators of compromises. Directionally connecting tactic blocks based on time, tactic, and matching criteria enables threats to be identified across multiple stages of an attack.

In one embodiment, tactic blocks are sorted by their start times and a tactic block C ("C") is directionally connected to a next tactic block N ("N") in time if the following time, tactic, and matching criteria are met:

Time criteria: C's end time is within P hours from N's start time (e.g., P=24 or 48 hours) and N's end time is after C's start time; AND Tactic criteria: C's tactic is before or the same as N's tactic in the sequence of tactics in the attack framework; AND Matching Criteria: The condition of:
  The nodes share the same username; OR
  The nodes share the same source host computer; OR
  Any of C's destination host computers matches N's source host computer; OR
  Other matching criteria, such as, for example, shared hash, email subject, or filename.

In the example above, the time criteria ensure that connected tactic blocks are sufficiently close in time. The tactic criteria ensures that the story told by connected blocks fits within the attack framework. The matching criteria helps to further ensure that connected tactic blocks are part of the same attack. As indicated above, the MITRE ATT&CK framework consists of twelve tactics that have a sequential order. Although cyber attacks do not necessarily follow the exact sequence of tactics in the MITRE ATT&CK sequence, the tactic sequence generally reflects the most common order in which the tactics appear. The tactic criteria ensures that the story told by connected blocks is consistent with the sequence of tactics in the attack framework.

Figure 2:
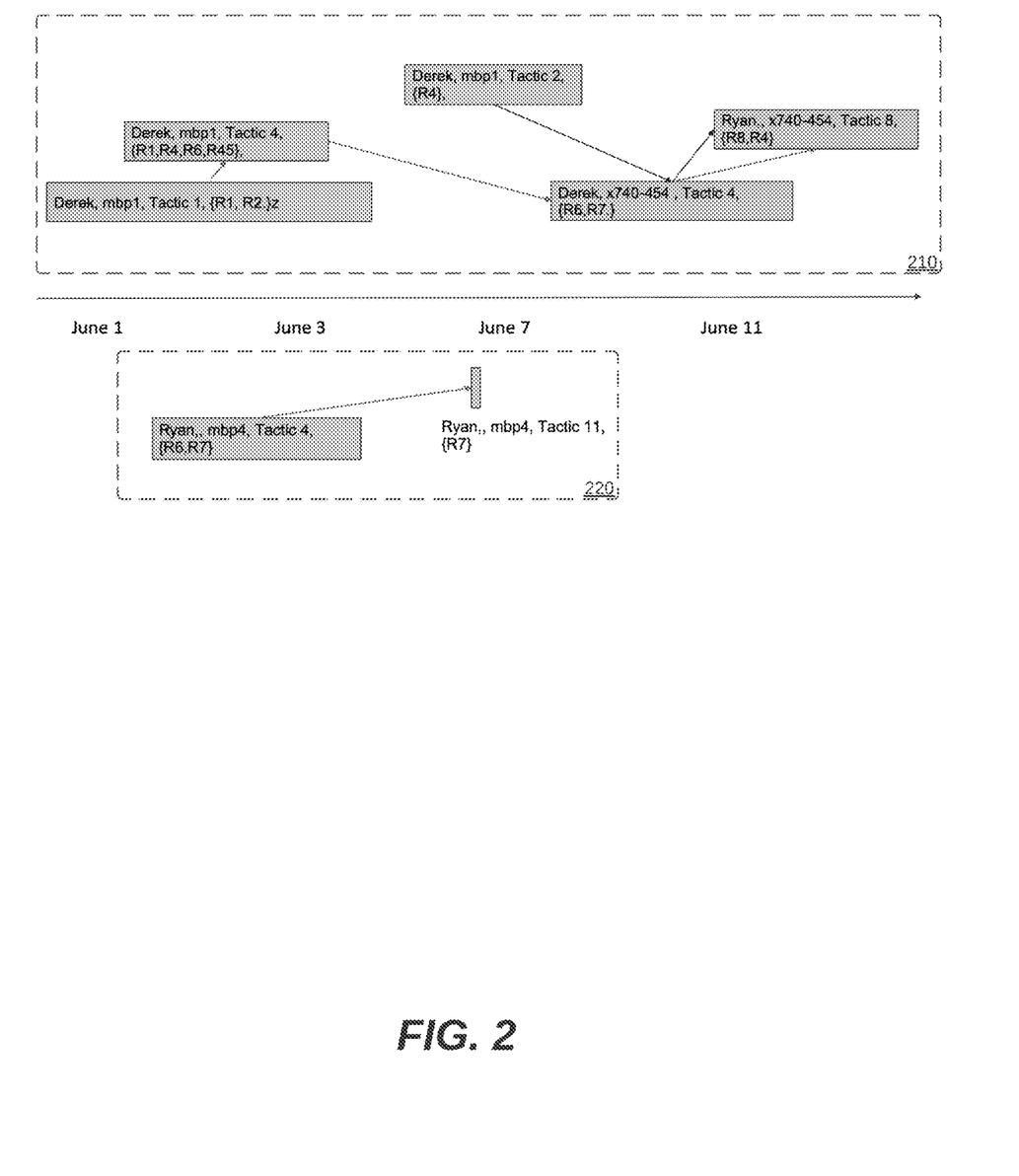
FIG. 2 illustrates an example graph of tactic blocks.

3. Identify Threat Scenarios from Clusters of Interconnected Tactic Blocks in the Graph Once the graph is constructed, the system identifies one or more independent clusters of interconnected tactic blocks in the graph (step 150). Each cluster is a collection of tactic blocks that are directionally coupled. There is no overlap between any pair of clusters. Each cluster captures a group of connected tactic blocks, and each cluster stands alone. In one embodiment, identifying clusters comprises identifying connected components in the graph, wherein each connected component is an independent cluster. FIG. 2 illustrates an example of graphed tactic blocks with two connected components, namely connected component 210 and connected component 220. The system may use a known connected components algorithm from the graph theory to identify connected components in the tactic blocks graph. An example of a connected component algorithm is set forth in in the following reference, which is incorporated herein by reference:

Hopcroft, J.; Tarjan, R. (1973), "Algorithm 447. Efficient algorithms for graph manipulation", *Communications of the ACM*, 16(6): 372-378, doi:10.1145/362248.362272.

For each of the clusters, the system identifies one or more threat scenario paths, wherein each path comprises a sequence of attack tactics in the attack framework (step 160). Each cluster has one or more paths of tactic blocks. A path of tactic blocks is a sequence of directionally connected tactic blocks that respects the sequence of tactics in the attack framework.

For each of the clusters, the system identifies a primary threat scenario based on a risk assessment associated with each of the threat scenario paths in the cluster (step 165). Only one primary threat scenario is associated with each cluster. In one embodiment, identifying a primary threat scenario for a cluster comprises identifying the path within the cluster that represents the highest-risk sequence of events in the cluster. In one embodiment, the system identifies the path associated with the highest-risk sequence of events in a cluster as follows:

- The system identifies the start nodes in the cluster. The start nodes are the tactic blocks with only outgoing edges and no incoming edges (i.e., they are directionally connected to only other tactic block(s) that have a later start time).
- Each of the start nodes serves as a starting point of a path within the cluster. Starting from a start node, a path follows the edges to nodes (i.e., tactic blocks) in time. When a node encounters a fork, new paths are instantiated, one for each node forked.
- Each alert is associated with a risk score or a risk probability based on the underlying rules or events that caused the alert to trigger. Each path is scored by summing up risk scores or risk probabilities associated with the alerts present in each node in the path. In certain embodiments, paths may be filtered based on thresholding on number of users involved, number of security vendor's alerts involved, time duration, etc.
- The highest-scoring path is selected as the primary threat scenario for the cluster, as it represents the highest-risk sequence of events in the cluster.

By identifying a sequence of attack tactics as a threat scenario, the system is able to detect threats across multiple stages of attack. The system ranks the primary threat scenarios based on the score associated with each primary threat scenario (e.g., the sum of the scores of all triggered rules in the primary threat scenario path) (step 170).

4. Visualizing Threat Scenarios in Context of the Attack Framework

The system displays information related to the highest-ranked primary threat scenarios, including the sequence of attack tactics in the attack framework associated with the threat scenario (step 180). In one embodiment, the n highest-ranked threat scenarios are displayed, wherein n is a positive integer. The sequence of attack tactics displayed for the threat scenario is based on the sequence of tactic blocks and associated tactics in the threat scenario.

Figure 3:
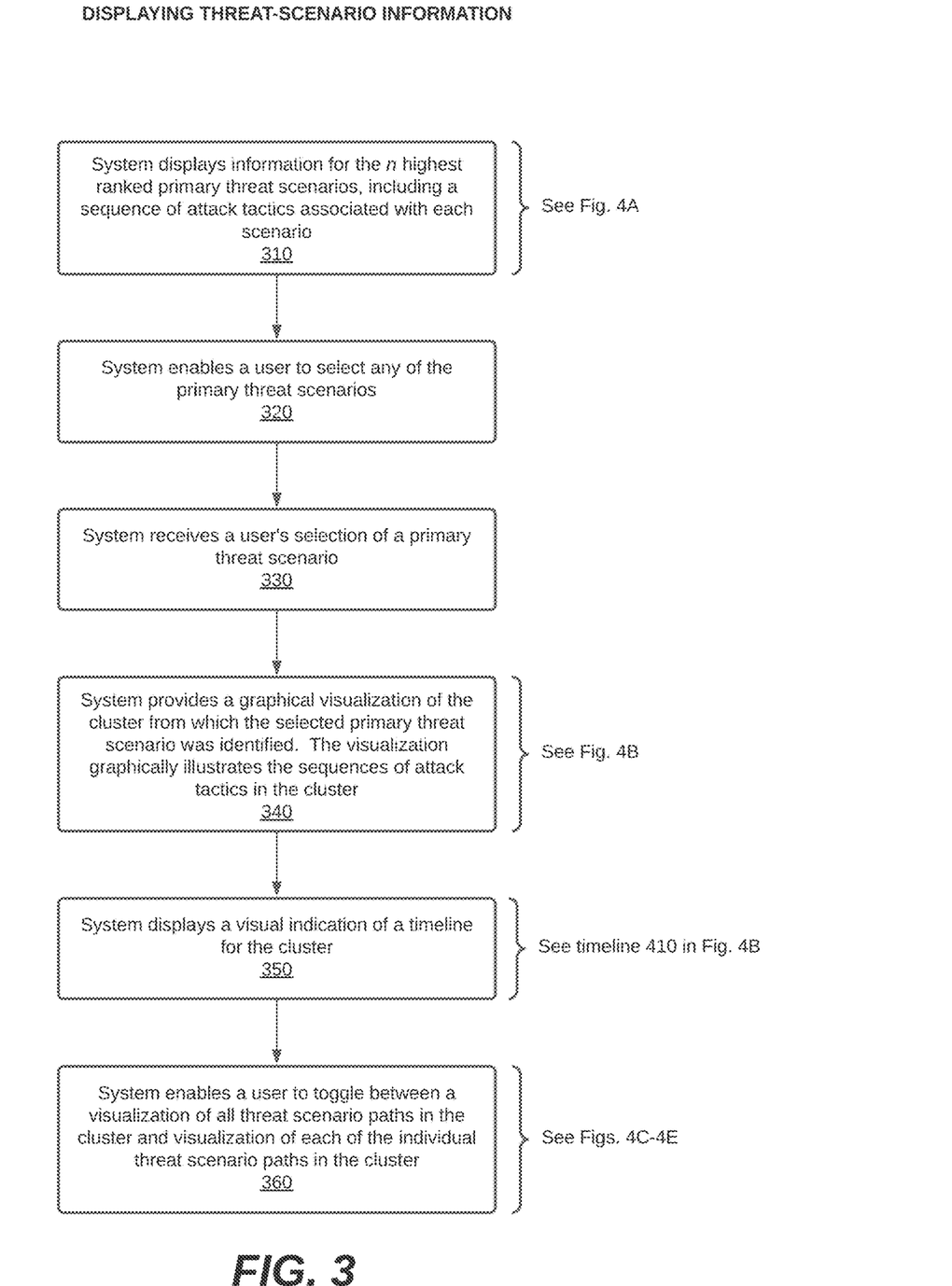
FIG. 3 illustrates a method, according to one embodiment, for displaying threat scenario information.
Figure 4A:
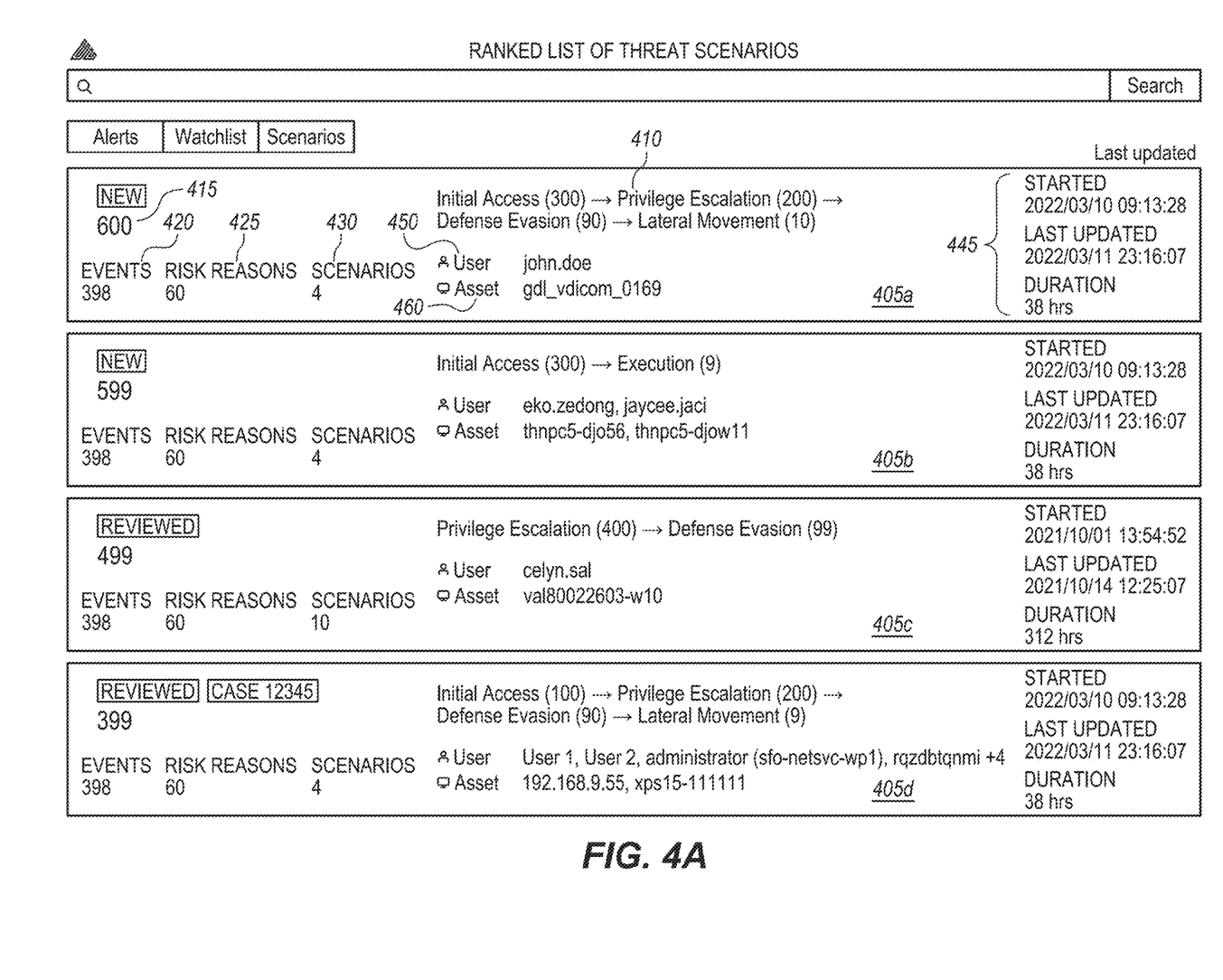
FIGS. 4A-4H are screenshots that illustrate example visualizations of threat scenario paths and related information.

FIG. 3 illustrates a method for displaying threat scenarios in the context of attack tactics in an attack framework. The system displays information for the n highest ranked primary threat scenarios (step 310). FIG. 4A illustrates an example of a user interface screen in which a list of the top n highest-ranked threat scenarios is displayed. Each row 405a-405d corresponds to a primary threat scenario. In this example, the information displayed for each threat scenario includes:

- A risk score 415 (the primary threat scenarios are ranked based on this risk score);
- A sequence 410 of attack tactics in the attack framework associated with the threat scenario;
- The number of events 420 in the threat scenario;
- The number of risk reasons 425 (e.g., triggered rules);
- The number of threat scenario paths 430 in the cluster from which the primary threat scenario was derived;
- The duration, start, and end times of the threat scenario 445; and
- The users 450 and assets 460 involved in the primary threat scenario.

Figure 4B:
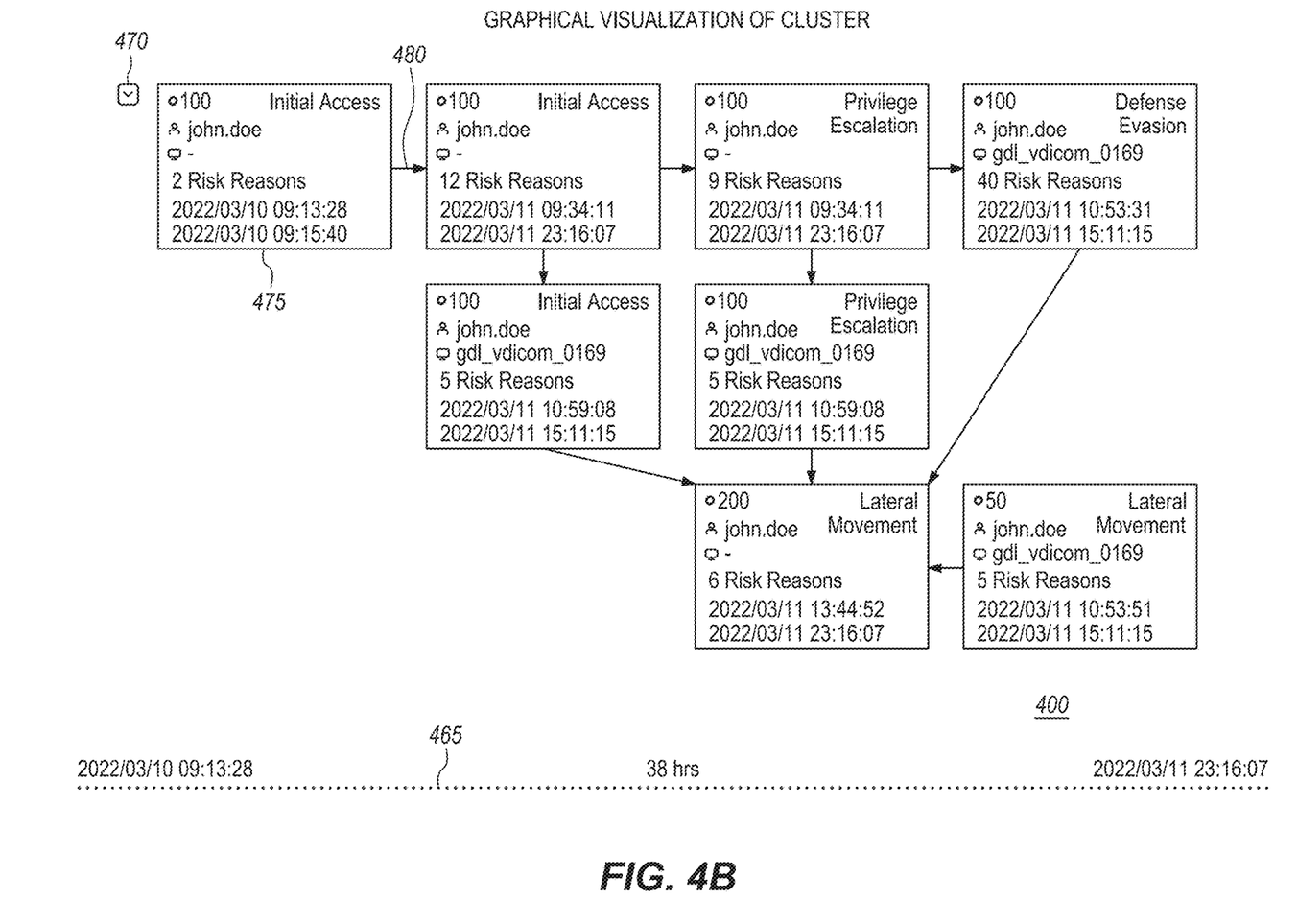

The system enables a user to select (e.g., click on) any of the displayed primary threat scenarios to receive more information about the threat scenario (step 320). In response to receiving a user's selection of a primary threat scenario, the system displays a graphical visualization of the cluster from which the selected threat scenario was identified (steps 330 and 340). FIG. 4B is an example of a graphical illustration of a cluster 400. The visualization includes a first type of GUI element (e.g., block 475) for each tactic block in the cluster and a plurality of second type GUI elements (e.g., arrow 480) illustrating directional connections between the tactic blocks. The displayed information effectively tells a story about the threat scenario in terms of the attack framework. The system also displays a visual indication of a timeline for the cluster (step 350), such as timeline 465 in FIG. 4B.

Figure 4C:
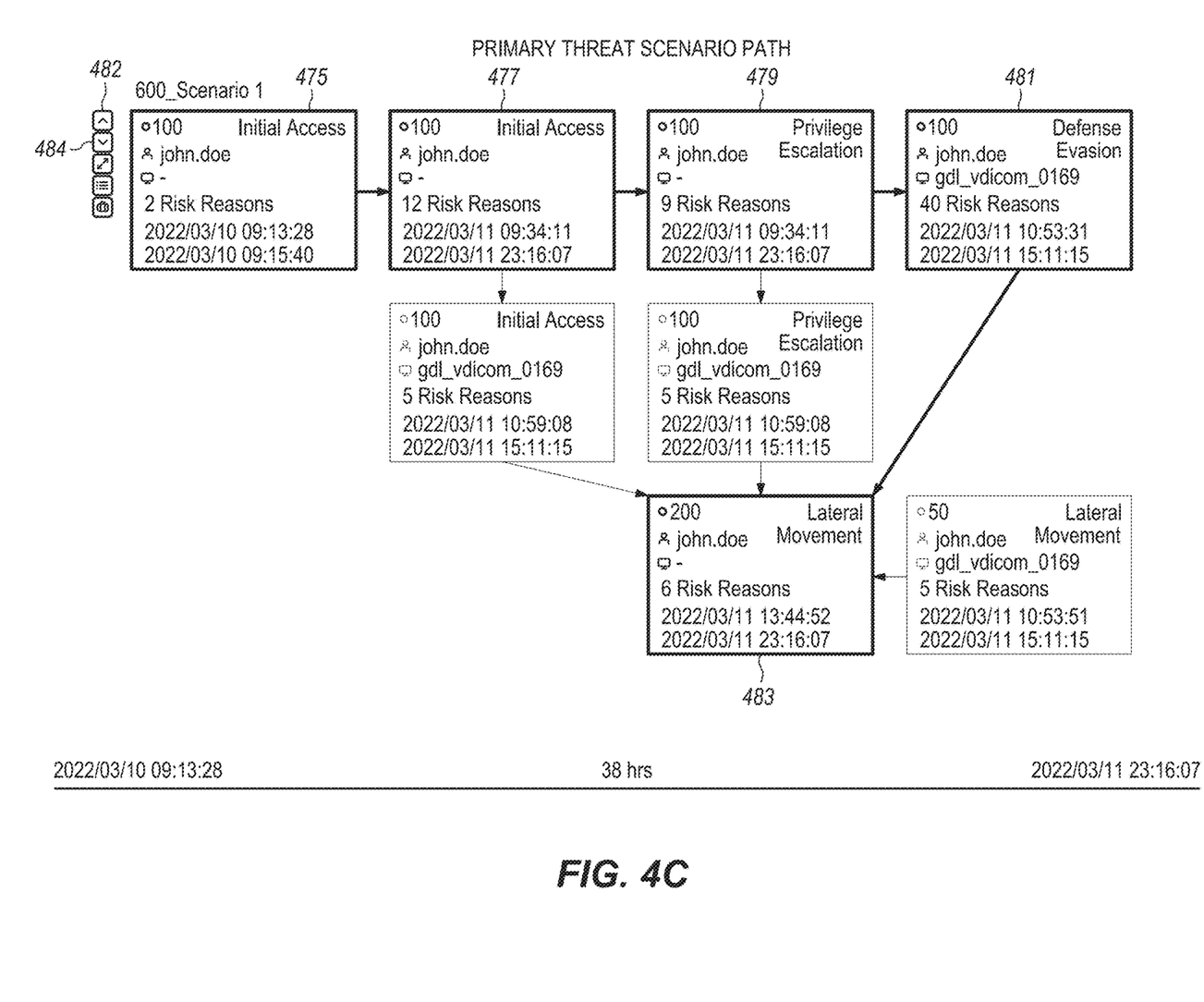
Figure 4D:
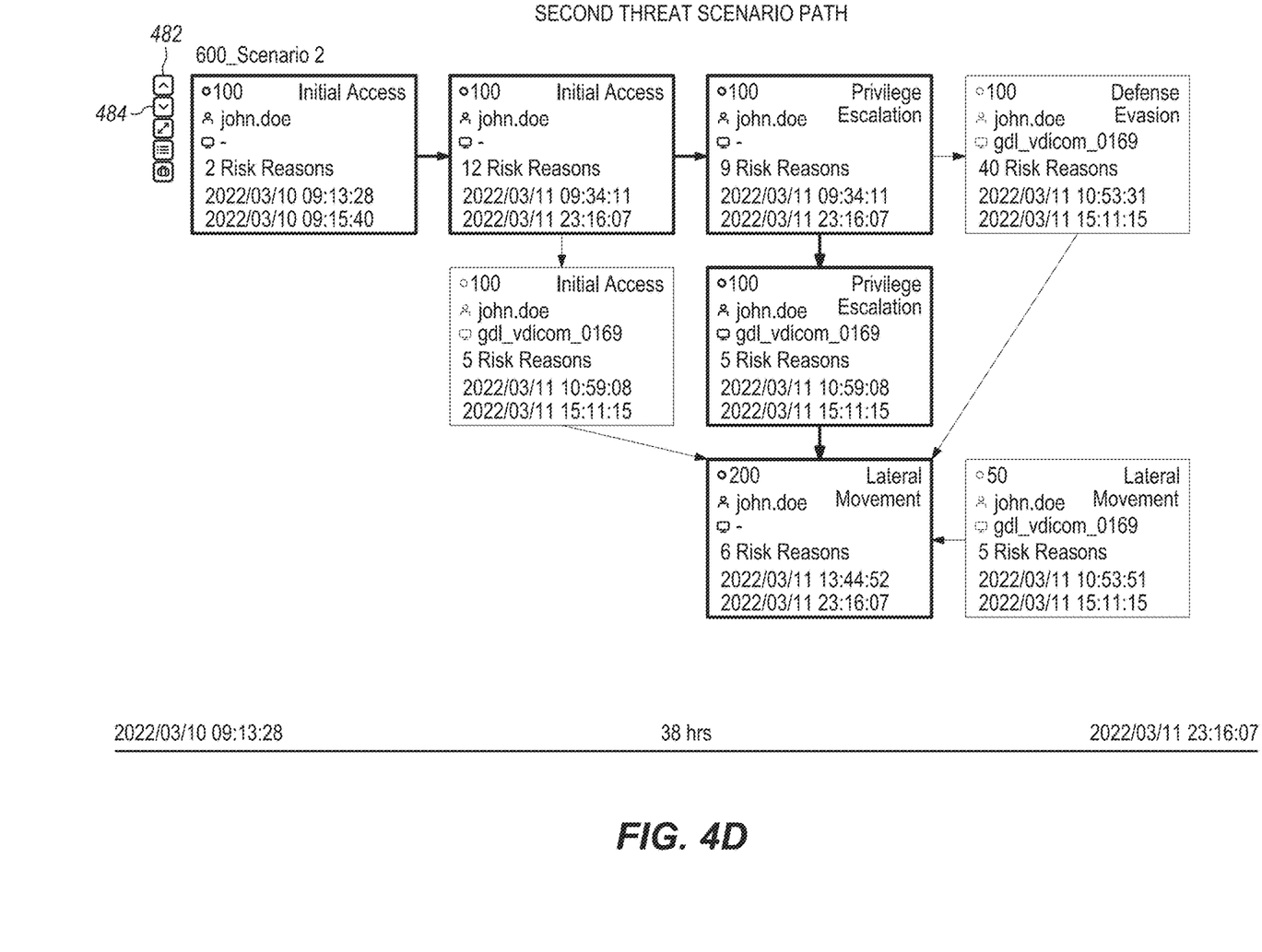
Figure 4E:
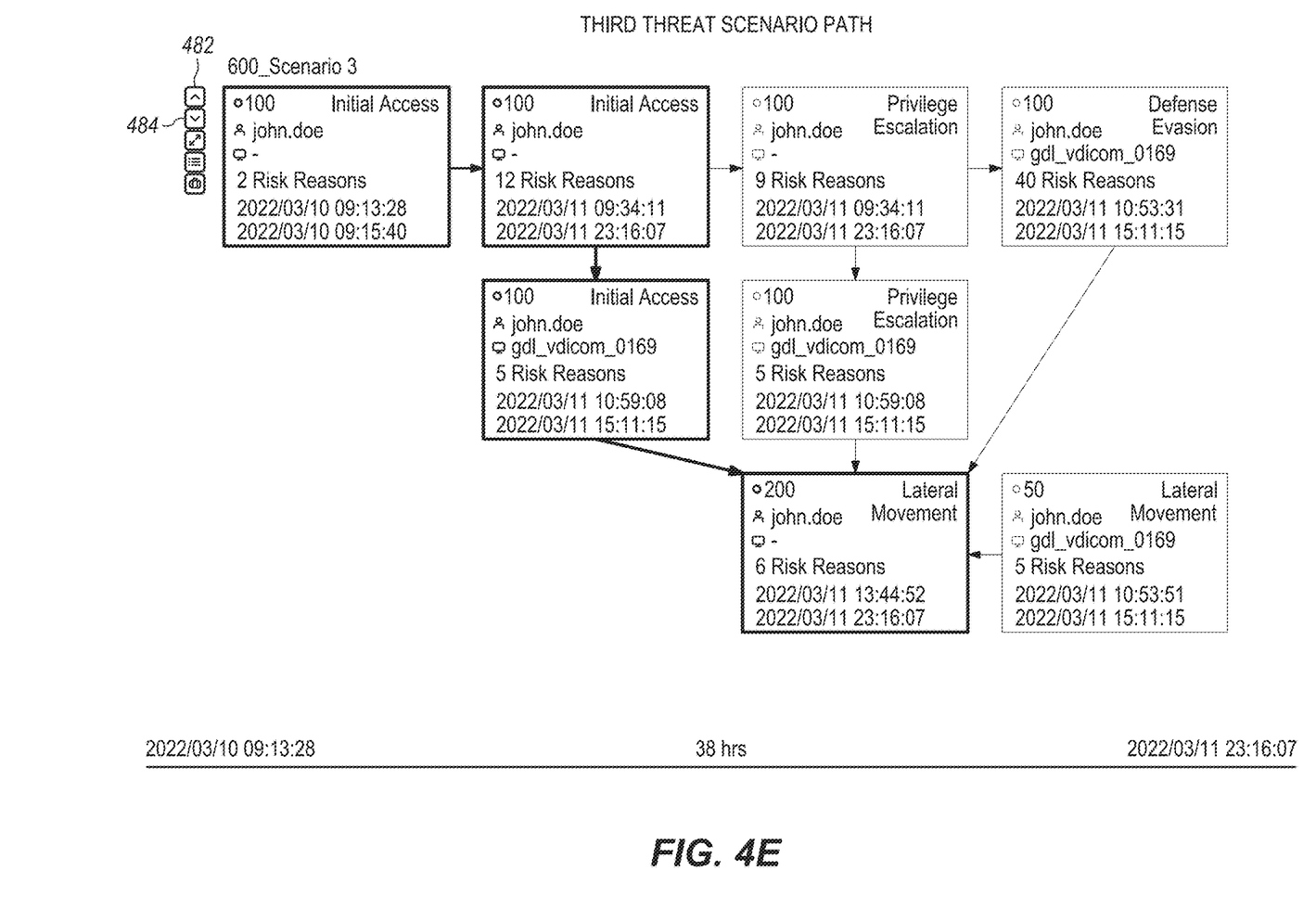

The system enables a user to toggle between a visualization of the cluster as a whole and visualization of each of the individual threat scenario paths in the cluster (step 360). In the screen illustrated in FIG. 4B, if a user selects button 470, the user interface changes from a display of the whole cluster to a display of the primary threat scenario path in the cluster, as shown in FIG. 4C. In this display, the threat blocks in the primary threat scenario path, which consists of blocks 475, 477, 479, 481, and 483 of the cluster, are highlighted or displayed more prominently than the other blocks in the cluster. This enables a user to clearly distinguish the blocks that make up the primary threat scenario path from the other blocks in the cluster. The threat blocks that are not part of the displayed path may be grayed out in the user interface. The display of FIG. 4C includes up and down arrow buttons 482, 484 that enable a user to further toggle between different threat scenario paths. The up arrow 482 enables a user to toggle to threat scenario paths associated with a higher risk assessment than the path currently displayed in the interface. If the user is currently viewing the primary threat scenario path, then selecting up arrow 482, which will cause the display to switch back to the view of the cluster in FIG. 4B. If the user clicks on the down arrow 484, the display changes to a threat scenario path having a lower (specifically, the next lower) risk assessment than the path currently displayed in the interface. If a user clicks on down arrow 484 from FIG. 4C, the display changes to FIG. 4D, which is the second-ranked (by risk points) threat scenario path in the cluster after the primary threat scenario path. If the user clicks on down arrow 484 from FIG. 4D, the display changes to FIG. 4E, which displays the third-ranked (by risk points) threat scenario path in the cluster. Up arrow 482 enables the display to go up the ranked threat scenario paths all the way up to the primary risk scenario path and then the cluster as a whole. In each of FIGS. 4C-4E, the threat blocks that make up the displayed path are displayed more prominently than the other blocks. As discussed above, each threat scenario path is a sequence of attack tactics in the attack framework, and the user interface screens described above provide the user with a graphical visualization of this sequence of attack tactics.

Figure 4F:
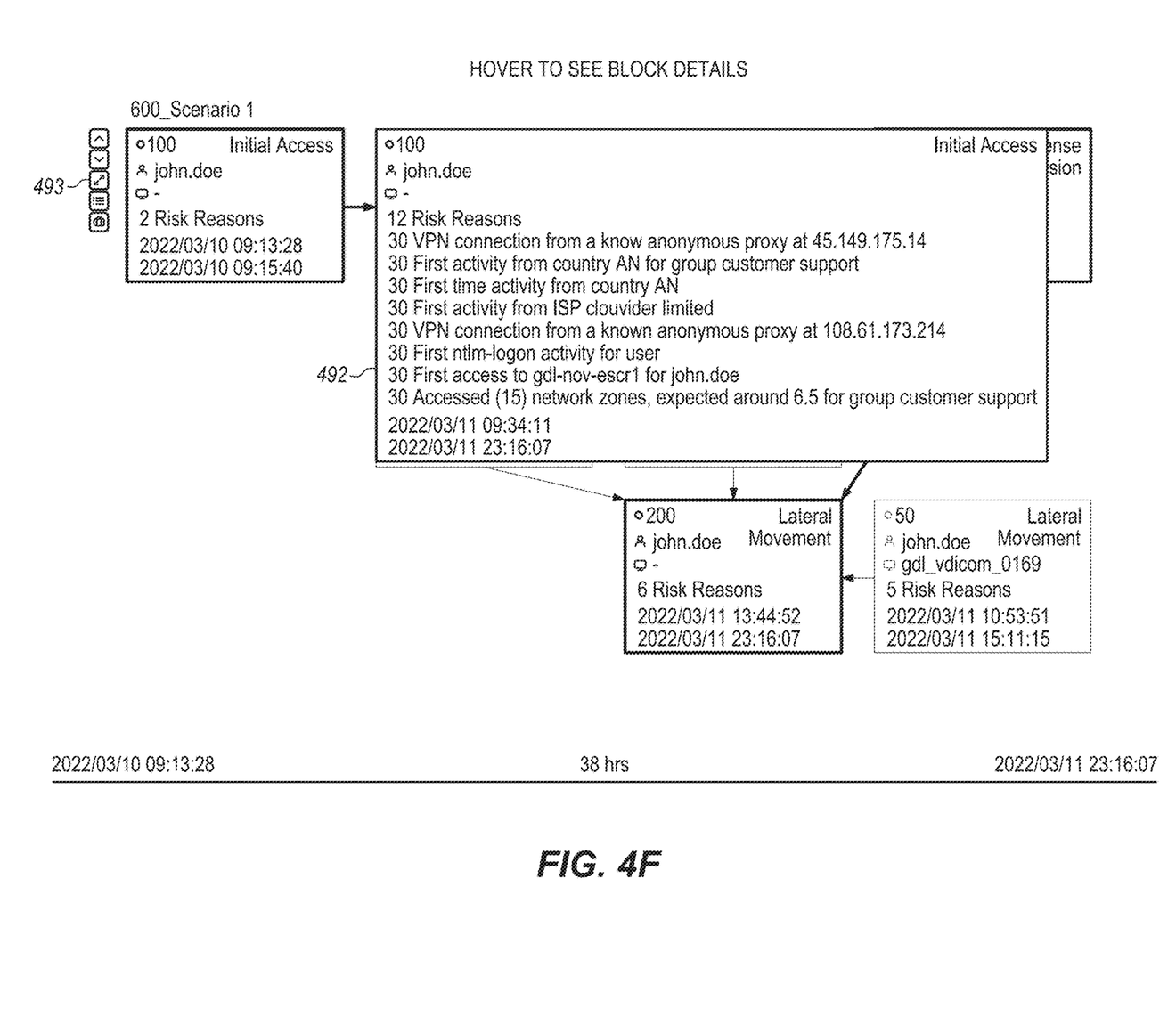
Figure 4G:
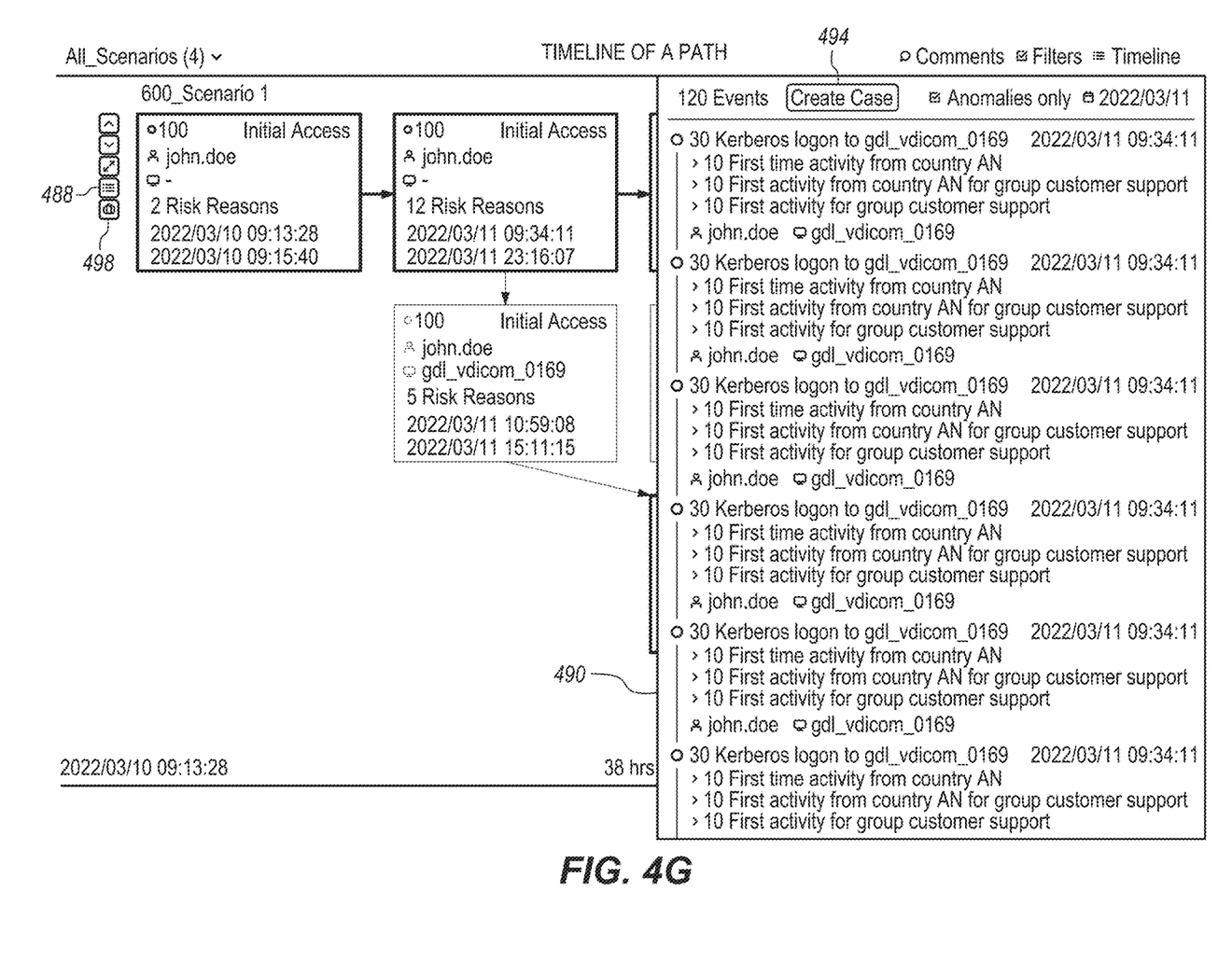

As the user toggles through the visualizations of the different threat scenario paths in the cluster, the timeline 465 changes as applicable to reflect the timeline of the threat scenario path that is displayed in the user interface. The system may also provide a call-to-action in the user interface that enables a user to obtain a more detailed timeline for a displayed threat scenario path. A call-to-action is an icon, button, link, or other UI element that enables a user to interact with the system to initiate an action by the system. FIG. 4G illustrates an example of a detailed timeline 490 for the primary threat scenario path of FIG. 4B. In this example, the user clicked on the "timeline" button 488 to see the detailed timeline.

A user may interact with GUI elements in the user interface to obtain additional information (e.g., context information) about individual tactic blocks, a threat scenario path, and or the cluster as a whole. For example, FIG. 4F illustrates a box 492 with additional information about a tactic block that appears when a user hovers over the tactic block. In the illustrated example, a user may click on button 493 to see more detailed information for all the tactic blocks in the displayed threat path scenario.

Figure 4H:
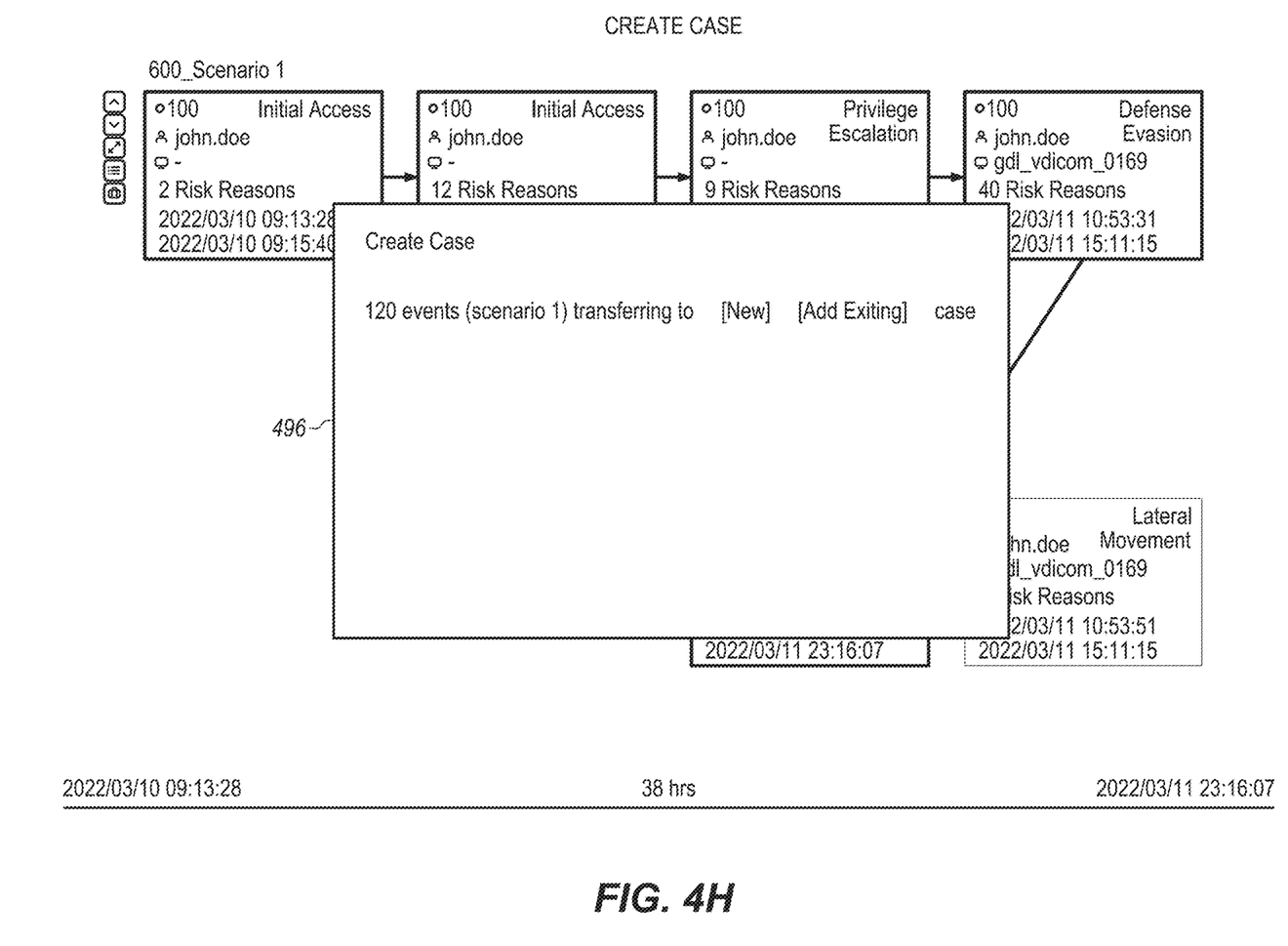

In certain embodiments, the GUI pages in which the visualizations are displayed include a call-to-action for creating a cybersecurity threat case in a cybersecurity case management system for a visualized threat scenario. For example, a user may click the "Create Case" button 494 or button 498 in FIG. 4G. In response to a user clicking either of these buttons, the user system displays a window 496 (see FIG. 4H) in which a user can specify whether the displayed threat scenario path should be a new case or added to an existing case. The window includes a call-to-action (e.g., a "submit" button, not shown), which if a user selects, will cause the system to send a request to a cybersecurity case management system to either create a new case for the displayed threat scenario path or to add the threat scenario to an existing case.

5. Alternate Embodiment

In an alternate embodiment, the system ranks and displays threats by cluster instead of by a primary threat scenario within a cluster. In such embodiment, it sums of the scores of the triggered rules/event in each of the tactic blocks of the cluster if applicable and ranks the clusters accordingly. In the display step, the system displays a ranked list of clusters. A user can then select any cluster in the list to see a visualization of the cluster and the individual threat scenario paths within the cluster.

6. General

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for graph-based, multi-stage attack detection in which alerts are visualized in the context of tactics in an attack framework, the method comprising:

obtaining a plurality of cybersecurity alerts generated in an analysis window;

classifying each of the alerts with an attack tactic in an attack framework having a sequence of attack tactics;

grouping the alerts into tactic blocks, where each tactic block is associated with a start time, an end time, and an attack tactic;

constructing a graph of tactic blocks by directionally connecting blocks based on a time criterion, a tactic criterion, and a matching criterion related to one or more fields in the plurality of cybersecurity alerts;

identifying one or more clusters of interconnected components in the graph of tactic blocks, wherein a cluster is a group of tactic blocks that are directionally coupled;

for each of the clusters, identifying one or more threat scenario paths in the cluster, wherein each threat scenario path comprises a sequence of attack tactics in the attack framework;

for each of the clusters, identifying a primary threat scenario based on a risk assessment associated with each of the threat scenario paths in the cluster;

ranking the primary threat scenarios; and displaying information for the n highest ranked primary threat scenarios, wherein n is a positive integer;

enabling a user to select any of the primary threat scenarios in the list to obtain a visualization related to the primary threat scenario;

in response to a user selecting a primary threat scenario from the list, performing the following:

providing a graphical visualization of the cluster from which the selected primary threat scenario was identified, wherein the visualization includes a first type of GUI element for each tactic block in the cluster and a plurality of second type GUI elements illustrating connections between the tactic blocks;

displaying a visual indication of a timeline for the cluster; and enabling a user to toggle between a visualization of all threat scenario paths in the cluster and visualizations of each of the individual threat scenario paths in the cluster, including a visualization of the primary threat scenario, wherein, as the user toggles through the visualizations, the display of the timeline is adjusted to reflect the timeline of the displayed threat scenario path.

2. The method of claim 1, wherein a GUI page in which the visualizations are displayed includes a call-to-action for creating a cybersecurity threat case in a cybersecurity case management system for a visualized threat scenario.

3. The method of claim 2, wherein, in response to a user selecting the call-to-action for creating a cybersecurity threat case, the method further comprises sending a new case request to the cybersecurity case management system for the threat scenario path displayed in the GUI page at the time the user selects the call-to-action.

4. The method of claim 1, further comprising enabling a user to interact with the GUI elements for the tactic blocks in the visualizations to obtain context information related to any of the tactic blocks.

5. The method of claim 1, wherein the time criteria for directionally connecting a first tactic block to a second tactic block is satisfied in response to the first block having an earlier start time than a second block and in response to the end time of the first block being within P hours of the start time of the second block.

6. The method of claim 1, wherein the tactic criteria is satisfied for directionally connecting the first block to the second block in response to the tactic associated with the first block being the same or proceeding the tactic associated with the second block in the attack framework.

7. The method of claim 1, wherein the matching criterion for directionally connecting the first block to the second block is satisfied in response to the first and second blocks satisfying one or more of the following:
  (a) the first and second blocks are associated with the same username;
  (b) the first and second blocks share the same source host computer;
  (c) any of the first block destination host computers matches the second block's source host computer; or
  (d) one or more alerts from the first block share a common value for a select attribute with one or more alerts from the second block.

8. A non-transitory computer-readable medium comprising a computer program, that, when executed by a computer system, enables the computer system to perform the following method for graph-based, multi-stage attack detection in which alerts are visualized in the context of tactics in an attack framework, the method comprising:
  obtaining a plurality of cybersecurity alerts generated in an analysis window;
  classifying each of the alerts with an attack tactic in an attack framework having a sequence of attack tactics;
  grouping the alerts into tactic blocks, where each tactic block is associated with a start time, an end time, and an attack tactic;
  constructing a graph of tactic blocks by directionally connecting blocks based on a time criterion, a tactic criterion, and a matching criterion related to one or more fields in the plurality of cybersecurity alerts;
  identifying one or more clusters of interconnected components in the graph of tactic blocks, wherein a cluster is a group of tactic blocks that are directionally coupled;
  for each of the clusters, identifying one or more threat scenario paths in the cluster, wherein each threat scenario path comprises a sequence of attack tactics in the attack framework;
  for each of the clusters, identifying a primary threat scenario based on a risk assessment associated with each of the threat scenario paths in the cluster;
  ranking the primary threat scenarios; and
  displaying information for the n highest ranked primary threat scenarios, wherein n is a positive integer;
  enabling a user to select any of the primary threat scenarios in the list to obtain a visualization related to the primary threat scenario;
  in response to a user selecting a primary threat scenario from the list, performing the following:
    providing a graphical visualization of the cluster from which the selected primary threat scenario was identified, wherein the visualization includes a first type of GUI element for each tactic block in the cluster and a plurality of second type GUI elements illustrating connections between the tactic blocks;
    displaying a visual indication of a timeline for the cluster; and
    enabling a user to toggle between a visualization of all threat scenario paths in the cluster and visualizations of each of the individual threat scenario paths in the cluster, including a visualization of the primary threat scenario, wherein, as the user toggles through the visualizations, the display of the timeline is adjusted to reflect the timeline of the displayed threat scenario path.

9. The non-transitory computer-readable medium of claim 8, wherein a GUI page in which the visualizations are displayed includes a call-to-action for creating a cybersecurity threat case in a cybersecurity case management system for a visualized threat scenario.

10. The non-transitory computer-readable medium of claim 9, wherein, in response to a user selecting the call-to-action for creating a cybersecurity threat case, the method further comprises sending a new case request to the cybersecurity case management system for the threat scenario path displayed in the GUI page at the time the user selects the call-to-action.

11. The non-transitory computer-readable medium of claim 8, further comprising enabling a user to interact with the GUI elements for the tactic blocks in the visualizations to obtain context information related to any of the tactic blocks.

12. A computer system for graph-based, multi-stage attack detection in which alerts are displayed in the context of tactics in an attack framework, the system comprising:
  one or more processors;
  one or more memory units coupled to the one or more processors, wherein the one or more memory units store instructions that, when executed by the one or more processors, cause the system to perform the operations of:
    obtaining a plurality of cybersecurity alerts generated in an analysis window;
    classifying each of the alerts with an attack tactic in an attack framework having a sequence of attack tactics;
    grouping the alerts into tactic blocks, where each tactic block is associated with a start time, an end time, and an attack tactic;
    constructing a graph of tactic blocks by directionally connecting blocks based on a time criterion, a tactic criterion, and a matching criterion related to one or more fields in the plurality of cybersecurity alerts;

identifying one or more clusters of interconnected components in the graph of tactic blocks, wherein a cluster is a group of tactic blocks that are directionally coupled;

for each of the clusters, identifying one or more threat scenario paths in the cluster, wherein each threat scenario path comprises a sequence of attack tactics in the attack framework;

for each of the clusters, identifying a primary threat scenario based on a risk assessment associated with each of the threat scenario paths in the cluster;

ranking the primary threat scenarios;

enabling a client computer to display a list of n highest ranked primary threat scenarios, wherein n is a positive integer;

enabling the client computer to provide a graphical visualization of a selected primary threat scenario and a corresponding cluster from which the selected threat scenario was identified, wherein:

the visualization includes a first type of GUI element for each tactic block in the cluster and a plurality of second type GUI elements illustrating connections between the tactic blocks;

the visualization includes a visual indication of a timeline for the cluster; and the user is able to toggle between a visualization of the cluster and visualizations of each of the individual threat scenario paths in the cluster, including a visualization of the selected primary threat scenario, wherein, as the user toggles through the visualizations, the display of the timeline is adjusted to reflect the timeline of the displayed threat scenario path.

13. The computer system of claim 12, wherein a GUI page in which the visualizations are displayed by the client computer includes a call-to-action for creating a cybersecurity threat case in a cybersecurity case management system for a visualized threat scenario.

14. The system of claim 13, wherein, in response to a user selecting the call-to-action for creating a cybersecurity threat case, the system sends a new case request to the cybersecurity case management system for the threat scenario path displayed in the GUI page at the time the user selects the call-to-action.

15. The system of claim 14, wherein the user is able to interact with the GUI elements for the tactic blocks in the visualizations to obtain context information related to any of the tactic blocks.

16. A method, performed by a client computer, for visualizing threat scenarios in the context of tactics in an attack framework, the method comprising:

receiving at a client computer information related to a plurality of primary threat scenarios, wherein each of the primary threat scenarios is associated with a cluster of interconnected components in a graph of tactic blocks, wherein the tactic blocks correspond to an attack tactic in an attack framework and wherein each cluster includes one or more threat scenario paths, including a primary threat scenario path;

displaying a list of the primary threat scenarios in a user interface of the client computer;

enabling a user to select any of the primary threat scenarios in the list to obtain a visualization related to the primary threat scenario;

in response to a user selecting a primary threat scenario from the list, performing the following on the client computer:

providing a graphical visualization of a cluster associated with the selected primary threat scenario, wherein the visualization includes a first type of GUI element for each tactic block in the cluster and a plurality of second type GUI elements illustrating connections between the tactic blocks;

displaying a visual indication of a timeline for the displayed cluster; and enabling a user to toggle between a visualization of the cluster and visualizations of each of the individual threat scenario paths in the cluster, including a visualization of the selected primary threat scenario, wherein, as the user toggles through the visualizations, the display of the timeline is adjusted to reflect the timeline of the displayed threat scenario path.

17. The method of claim 16, wherein a GUI page in which the visualizations are displayed includes a call-to-action for creating a cybersecurity threat case in a cybersecurity case management system for a visualized threat scenario.

18. The method of claim 17, wherein, in response to a user selecting the call-to-action for creating a cybersecurity threat case, the client computer sends a new case request to the cybersecurity case management system for the threat scenario path displayed in the GUI page at the time the user selects the call-to-action.

19. The method of claim 16, further comprising enabling a user to interact with the GUI elements for the tactic blocks in the visualizations to obtain context information related to any of the tactic blocks.

* * * * *